United States Patent
Schoenfuss et al.

(10) Patent No.: US 9,850,961 B2
(45) Date of Patent: Dec. 26, 2017

(54) CLUTCH PEDAL SYSTEM AND MASTER CYLINDER FOR A CLUTCH PEDAL SYSTEM OF A VEHICLE

(71) Applicant: FORD GLOBAL TECHNOLOGIES, LLC, Dearborn, MI (US)

(72) Inventors: Steffen Schoenfuss, Odenthal (DE); Christina Kallas, Rommerskirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 74 days.

(21) Appl. No.: 14/836,588

(22) Filed: Aug. 26, 2015

(65) Prior Publication Data

US 2016/0061276 A1 Mar. 3, 2016

(30) Foreign Application Priority Data

Aug. 28, 2014 (DE) ......................... 10 2014 217 199

(51) Int. Cl.
*F16D 25/08* (2006.01)
*F16D 25/12* (2006.01)
(Continued)

(52) U.S. Cl.
CPC ............ *F16D 25/088* (2013.01); *B60K 23/02* (2013.01); *B60K 26/02* (2013.01); *B60T 7/06* (2013.01);
(Continued)

(58) Field of Classification Search
CPC .............................................. B60K 2023/025
See application file for complete search history.

(56) References Cited

U.S. PATENT DOCUMENTS

2001/0027368 A1* 10/2001 Minowa ............ B60W 30/1819
701/70
2002/0084162 A1* 7/2002 Schafer .................. B60T 1/005
192/13 A
(Continued)

FOREIGN PATENT DOCUMENTS

DE         69915368 T2     2/2005
DE       102007059376 A1   6/2009
(Continued)

OTHER PUBLICATIONS

Machine Translation of German Examination Reported dated May 13, 2015 for German Application No. 102014217199.7.

*Primary Examiner* — Jacob S Scott
*Assistant Examiner* — Timothy M Hannon
(74) *Attorney, Agent, or Firm* — Jones Robb, PLLC; Raymond L. Coppiellie (57) ABSTRACT

The clutch pedal system for a vehicle, such as a motor vehicle, is disclosed. The clutch pedal system includes a pedal carrier having a fastening region configured to be associated with an aperture in a bulkhead and/or a dashboard carrier of the vehicle. A clutch pedal is pivotably mounted on the pedal carrier. A master cylinder is supported on an adapter region of the pedal carrier and is connected to the clutch pedal. The master cylinder is positioned such that at least a portion of the master cylinder extends through the aperture, wherein the pedal carrier is configured to position the master cylinder in a predetermined position relative to the bulkhead and/or of the dashboard carrier.

18 Claims, 8 Drawing Sheets

(51) Int. Cl.
　　　*G05G 1/30*　　　(2008.04)
　　　*B60T 7/06*　　　(2006.01)
　　　*B60K 26/02*　　　(2006.01)
　　　*B60K 23/02*　　　(2006.01)

(52) U.S. Cl.
　　　CPC ............... *F16D 25/12* (2013.01); *G05G 1/30* (2013.01); *B60K 2023/025* (2013.01); *F16D 2025/081* (2013.01)

(56) References Cited

U.S. PATENT DOCUMENTS

2011/0022280 A1* 1/2011 Greenwood-Smith F16D 25/088
　　　　　　　　　　　　　　　　　　　　　　701/68
2017/0008499 A1* 1/2017 Tsuchiya ................ B60T 8/171

FOREIGN PATENT DOCUMENTS

| DE | 102009027042 A1 | 12/2010 |
|---|---|---|
| DE | 102010044417 A1 | 3/2012 |
| JP | 2002242955 A * | 8/2002 |

* cited by examiner

CLUTCH PEDAL SYSTEM AND MASTER CYLINDER FOR A CLUTCH PEDAL SYSTEM OF A VEHICLE

CROSS REFERENCE TO RELATED APPLICATIONS

This application claims priority to German Application No. 102014217199.7, filed on Aug. 28, 2014, the entire content of which is incorporated by reference herein.

TECHNICAL FIELD

The present disclosure relates generally to a clutch pedal system for a vehicle, in particular a motor vehicle.

BACKGROUND

With the exception of vehicles with fully or semi-automatic transmission, the drive and the shiftable transmission are separated by manual actuation of a clutch. For this purpose, the clutch is connected to a clutch pedal arranged in the vehicle interior and the clutch pedal is mounted pivotably on a pedal carrier.

The clutch cables used for force transmission are increasingly being replaced by hydraulic systems, which allow maintenance-free and, in particular, low-friction actuation. Hydraulic systems of this kind require a master cylinder connected to the clutch pedal. The clutch itself, on the other hand, has a slave cylinder, which is connected to the master cylinder for fluid transmission by a pressure line. The actuation of the clutch, which is thus hydraulic, is accomplished by appropriate modification of the pressure and/or volume flow of the hydraulic fluid contained in the hydraulic system.

The construction of a clutch pedal system of this kind envisages that the master cylinder, which is connected to the clutch pedal, is supported on the pedal carrier. The actual arrangement of the clutch pedal in the vehicle interior is accomplished by means of the pedal carrier.

The master cylinders are preferably standardized components with respect to, for example, the stroke and piston diameter thereof. This is essentially because identical parts are more economical to produce overall and easier to store as spare parts. However, vehicle-specific and model-dependent differences do not allow the use of master cylinders of identical construction. Thus, even differences in the inclination angle of the bulkhead and/or of the dashboard carrier contribute to the need for a redesign of the master cylinder. The underlying reason is that the alignment of the master cylinder relative to the clutch pedal changes with differences in the inclination angle, requiring a corresponding adaptation of the master cylinder. This is especially the case, given that the master cylinder and the hydraulic connections thereof must be in a definite position and/or orientation in order, for example, to enable bleeding of the hydraulic system.

In view of the increasing number of different master cylinder designs due to the increasing variety of models and vehicle-specific differences, it is completely impossible to achieve the preferred use of identical parts, or possible only with difficulty. This is disadvantageous, in particular, inasmuch as the hydraulic power of the master cylinder generally remains the same, despite the need for redesign. Given this situation, there is room for improvement in the design of clutch pedal systems and the master cylinders thereof in terms of an economical modular system.

SUMMARY

In accordance with various exemplary embodiments, the present disclosure provides a clutch pedal system for a vehicle. The clutch pedal system comprises a pedal carrier having a fastening region configured to be associated with an aperture in a bulkhead and/or a dashboard carrier of the vehicle. A clutch pedal is pivotably mounted on the pedal carrier. A master cylinder is supported on an adapter region of the pedal carrier and connected to the clutch pedal. The master cylinder is positioned such that at least a portion of the master cylinder extends through the aperture, wherein the pedal carrier is configured to position the master cylinder in a predetermined position relative to the bulkhead and/or of the dashboard carrier.

In accordance with various exemplary embodiments, the present disclosure also provides a method of installing a clutch pedal system in a vehicle. The method comprises selecting a pedal carrier based at least in part on an angle of a bulkhead and/or a dashboard carrier of the vehicle, positioning a universal master cylinder on the selected pedal carrier, and connecting the selected pedal carrier to an aperture of the bulkhead and/or dashboard carrier to position the master cylinder in a predetermined position relative to the bulkhead and/or dashboard carrier.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

In the different drawings, identical parts are in all cases provided with the same reference signs, and therefore they are generally also described only once.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a clutch pedal system for a vehicle, such as a motor vehicle, is provided. The clutch pedal system is designed to be arranged in the foot well of an interior of the vehicle.

Accordingly, the clutch pedal system comprises a pedal carrier, on which a clutch pedal is pivotably mounted. The pedal carrier has a fastening region, wherein the pedal carrier is designed to be arranged by means of its fastening region in the region of an aperture situated in a bulkhead and/or a dashboard carrier of the vehicle. A master cylinder is provided, which is supported on the pedal carrier and is connected to the clutch pedal. In other words, the master cylinder extends between the pedal carrier and the clutch pedal in such a way that actuation of the clutch pedal leads to actuation of the master cylinder.

In accordance with one exemplary embodiment, the master cylinder has a cylinder piston and a piston rod supported therein and capable of linear displacement. In this arrangement, the variable penetration depth of the piston rod into the cylinder piston depends on the position of the clutch pedal. The master cylinder is connected to a suitable hydraulic system for fluid transmission, thus allowing the actuation of the clutch pedal to be transmitted to the clutch by pressure and/or volume flow.

The master cylinder is provided so that, in the installed state of the pedal carrier, at least a section of the master cylinder extends through the aperture arranged in the bulkhead and/or the dashboard carrier of the vehicle. In this case, the master cylinder preferably extends in the direction of the engine compartment of the vehicle.

In accordance with the present teachings, the pedal carrier has an adapter region, by means of which the master cylinder is connected to the pedal carrier. It should be understood that the pedal carrier may be regarded as a replaceable component of the clutch pedal system in accordance with the present teachings. In other words, the replaceable pedal carrier is designed to compensate any differences in the inclination angle of the bulkhead and/or of the dashboard carrier of the vehicle, while retaining the master cylinder.

Accordingly, the master cylinder should be regarded as a component of the clutch pedal system which is suitable for universal use and which itself does not depend on other elements of the clutch pedal system and, therefore, does not require special configuration in the event of changes in installation conditions. On the contrary, an advantage of the replaceable pedal carrier is that the respectively required position of the universal master cylinder can now be adapted through the different configurations of the pedal carrier in terms of the alignment of the adapter region of the pedal carrier relative to the fastening region of the pedal carrier.

The resulting advantage permits the universal use of what is may be single embodiment of the master cylinder or at least an embodiment which is reduced to a few versions. Compared with the master cylinder, the complexity and, hence, cost of production of the pedal carrier can be regarded as low, and therefore the universal use of the master cylinder makes it possible to achieve a high degree of economy as regards the production thereof and subsequent storage thereof. Further developments in individual vehicle models, in particular, may not require any re-adaptation of the master cylinder, even in the future. This also makes it possible to use the same master cylinder for different model vehicles.

Moreover, the orientation and/or position of the master cylinder, which is independent of the inclination of the bulkhead and/or of the dashboard carrier, can be maintained at all times and is constant, enabling the master cylinder to be bled when required. This may be necessary, for example, when there is leakage caused by vibration, which may result in unwanted air ingress into the hydraulic system. For this purpose, the master cylinder can preferably have a suitable bleed system, which allows appropriate access to a reservoir in the unactuated state of the clutch pedal. Owing to the fact that the air which has penetrated rises, the bleed system, in the form of a bleed hole for example, must be arranged in an upper region, in particular in the highest region of the master cylinder. This ensures that the air can escape from the hydraulic system. Incorrect positioning of the master cylinder when mounted directly on the bulkhead at different inclination angles and/or on the dashboard carrier could make any necessary bleeding more difficult.

On its way out of the hydraulic system, the air to be removed reaches a high-pressure connection arranged on the master cylinder, for example, from where it can escape through a cylinder body of the master cylinder via the bleed system. The bleed system can be connected to a low-pressure connection, for example, via which the air can ultimately enter the reservoir.

In accordance with one exemplary embodiment, the pedal carrier can be produced from plastic, making it possible to achieve simple manufacture and adaptation to changing inclination angles of the bulkhead and/or of the dashboard carrier. Accordingly, the pedal carrier itself can be regarded as a kind of adapter for using universal master cylinders with different inclination angles of the bulkhead and/or of the dashboard carrier. Of course, the pedal carrier may also be made from other suitable materials such as, for example, metals including light metal.

The fastening region of the pedal carrier, which is in contact at least in some region or regions with the bulkhead and/or the dashboard carrier in the installed position, can be adapted to the differences in inclination of the bulkhead and/or the dashboard carrier. This ensures that the position and arrangement of the clutch pedal and/or the master cylinder are maintained, while only the fastening region varies.

In accordance with one aspect of the present disclosure, the adapter region of the pedal carrier comprises at least one latching means. The latching means is provided for the purpose of connecting the master cylinder to the pedal carrier. Accordingly, it is possible to couple the master cylinder and the pedal carrier while managing without further fastening means, such as screws, nuts and/or bolts. In this way, it is possible to achieve a simple and, in particular, quick connection between these components of the clutch pedal system, which likewise contributes overall to the more economical construction thereof.

The at least one latching means also allows rapid replacement of the master cylinder since there is no need for the undoing of other fastening means, such as screws, nuts and/or bolts, which is an involved process in some cases. Of course, however, the latching means can also be combined with fastening means of this kind, if required.

Those of ordinary skill in the art will understand that a latching means can take on many different designs, based at least in part on the forces which are to be absorbed during the depression and/or release of the clutch pedal. Various types of latching means, such as for example, a bayonet, a cam lock, a compression latch, a draw latch, a rotary latch, and a push-and-click. Those of ordinary skill in the art also will understand that the design of the adapter region of the pedal carrier, which must likewise durably pass on to the bulkhead and/or dashboard carrier the forces transmitted to it via the master cylinder, may be selected based on the forces to be withstood. Examples of a suitable adapter region may include quick-on fuel filler caps and under body attachments of wires and hoses. The present disclosure contemplates that the master cylinder has a fastening collar, which corresponds to the adapter region of the pedal carrier. A fastening collar is taken to mean, for example, a collar which is arranged at least partially in the circumferential direction around the master cylinder and which, when the master cylinder is inserted into the pedal carrier, comes into contact at least partially with the adapter region thereof. Accordingly, the orientation of the master cylinder can be predetermined by the position of the fastening collar in contact with the adapter region. This means that no further-reaching measures are required in order to position the master cylinder in the required alignment relative to the pedal carrier and thus in the foot well.

Moreover, the master cylinder does not have any direct fastening on the bulkhead and/or the dashboard carrier, and therefore its orientation is decoupled from the variation in the inclination the bulkhead and/or the dashboard carrier by means of the pedal carrier.

In accordance with one exemplary embodiment, the fastening collar may be configured such that, in the state of the master cylinder in which it is connected to the pedal carrier, the collar is in engagement at least in some region or regions with the latching means of the adapter region or the latching means is in engagement at least in some region or regions with the fastening collar. Accordingly, the fastening collar can perform a dual function, since it is used both to align and to fix the master cylinder on the pedal carrier.

The pedal carrier has an end stop for the clutch pedal. In other words, the end stop is designed to limit the maximum pivoting range for the depression of the clutch pedal. As a result, the maximum travel of the clutch pedal ends at the moment in which the pivotability thereof is ended by contact with the end stop. As compared with embodiments which provide limitation of the travel for the clutch pedal by means of the master cylinder itself, the result is lower loading and lower-cost configurations of the universal master cylinder.

The end stop can be adjustable in such a way that prior and/or subsequent setting of the maximum clutch pedal travel is made possible.

One advantage resulting from the end stop being arranged on the pedal carrier is a significant relief of the load on the master cylinder. Thus, the master cylinder does not have to accept and pass on the forces, which are sometimes high, which can occur when the person operating the vehicle is supported on the depressed clutch pedal. For example, the adapter region of the pedal carrier which receives the master cylinder can thus be made less strong since it does not have to accept the forces which would otherwise be introduced via the master cylinder. Instead, these can now be introduced directly into the end stop, relieving the structure of load overall.

The end stop can be arranged on a region of the pedal carrier which is situated radially as far away as possible from the pivoting axis of the clutch pedal, with the result that the clutch pedal lever arm acting on the end stop is reduced as much as possible. The forces to be accepted by the end stop can thereby be minimized in a corresponding way, simplifying the embodiment thereof and/or allowing it to be produced more economically overall.

According to another aspect of the present disclosure, the clutch pedal system can be sealed off in its installed position within the vehicle with respect to the aperture in the bulkhead and/or the dashboard carrier in a manner that is easy to achieve. For this purpose, the fastening region of the pedal carrier can, for example, comprise a frame, at least a section of which can be placed around the aperture in the bulkhead and/or in the dashboard carrier of the vehicle in the installed position. In this context, "can be placed" means that, in the installed position, the pedal carrier rests at least partially by means of its frame on or at least as close as possible to those regions of the bulkhead and/or of the dashboard carrier which delimit the aperture.

In connection with the assembly of the clutch pedal system, a suitable sealing means may be used to seal the frame with respect to the aperture. This seal can, for example, be an initially shapeless material, which is applied either before or after the pedal carrier is fixed on the bulkhead and/or the dashboard carrier and then cures elastically, for example. Thus, the sealing means can be arranged at least partially around the frame of the pedal carrier or between the pedal carrier and those regions of the vehicle which delimit the aperture.

In one exemplary embodiment, a sealing means may be in the form of an already pre-produced seal, allowing the pedal carrier to be sealed off with respect to the bulkhead and/or the dashboard carrier of the vehicle by means of the frame while incorporating such a sealing means. After this, the sealing means pre-produced in this way can be applied either to the frame or around the aperture, with the result that the sealing means is integrated in the manner indicated above in the installed state of the clutch pedal system.

Alternatively or additionally, a sealing means can be arranged between the adapter region of the pedal carrier and the master cylinder mounted thereon. In this way, the sealing effect that can be achieved by this means can be established either in the plane of the frame or of the adapter region. A corresponding combination of two sealing means can be used in order to achieve reliability, in particular high reliability, as regards the sealing effect required.

In the context of the present disclosure, a sealing means is also regarded as being such if, apart from its sealing effect, e.g. in respect of foreign bodies and/or fluids, it also or only develops a decoupling effect with respect to vibrations that occur. The unwanted transmission of troublesome vibrations in the form of audible and/or perceptible vibrations can thereby be completely or at least significantly reduced.

Examples of suitable sealing means to be used in combination with the structures described herein include door seals, steering column floor seals, sun roof seals, and tail gate seals.

In order to achieve as comfortable as possible operation of the clutch pedal, the present disclosure contemplates that the clutch pedal system in accordance with the present teachings can include at least one overcenter spring ("OCS"). In German, the terms "Übertotpunktfeder" and "Totpunktfeder" are used to identify a spring (or an alternative to a spring) of this kind.

Overcenter springs used in clutch pedal systems are used to reduce the actuating force required to hold the depressed clutch pedal, while waiting at a junction, when turning off or at traffic lights, for example. To achieve this, the overcenter spring is not designed as a tension spring but as a compression spring, with the result that the first part of the clutch pedal travel initially takes place against the force of the overcenter spring, with the spring being compressed. By means of a suitable spring arrangement, the overcenter spring reaches its maximum compression (overcenter position) approximately in the center of the clutch pedal travel, and relaxes again if the clutch pedal is depressed further. As a result, the overcenter spring cooperates as it were if approximately half the clutch pedal travel is exceeded, thus reducing the force still required from the person operating the vehicle to hold down the clutch pedal.

The present disclosure contemplates that the over center spring can be arranged between the pedal carrier and the clutch pedal. For this purpose, the pedal carrier can, for example, have a clevis bearing, in which the overcenter spring can be pivotably mounted. The clutch pedal can furthermore have a lever arm, which is arranged rigidly thereon, for example, and which can be connected to the overcenter spring at the end. In this way, the joint between the overcenter spring and the lever arm can form a kind of toggle joint, which is more or less fully extended once the overcenter position is reached. In other words, the lever arm and the overcenter spring are then in line in respect of their respective extent.

The clutch pedal system in accordance with the present teachings allows an extremely high level of use of the same basic type of master cylinder. In other words, the clutch pedal system now allows use of what is preferably a single basic embodiment of the master cylinder, independently of the respective inclination of the bulkhead and/or of the dashboard carrier. This is due at least in part to the fact that the pedal carrier is now regarded as a replaceable adapter component, by means of which any changes in the angle of the bulkhead and/or of the dashboard carrier are compensated. Owing to the ability to now use the same master cylinder as an identical part, the production thereof and also subsequent storage, e.g. as a spare part, are possible in an extremely economical way.

Thus, even a multiplicity of different master cylinders which were used previously can be reduced to a single basic form since both existing vehicles and also future models are equipped with the same basic type of master cylinder using the respective pedal carrier configured as required.

The present disclosure is further directed to a master cylinder as a universal master cylinder for a clutch pedal system of a vehicle. In one exemplary embodiment, the master cylinder in accordance with the present teachings can be a master cylinder of the kind used in the clutch pedal system described above. In other words, there is the possibility of using the master cylinder in conjunction with the clutch pedal system indicated above.

For this purpose, the master cylinder according to the present disclosure is designed, on the one hand, to be connected to a clutch pedal pivotably mounted on a pedal carrier and, on the other hand, to be supported on the pedal carrier. Thus, the master cylinder can preferably extend between the respective clutch pedal and the associated pedal carrier in the installed state.

In this arrangement, the master cylinder is provided so that, in the installed state of the clutch pedal system equipped in this way in the vehicle, at least a section thereof extends through an aperture situated in a bulkhead and/or a dashboard carrier of the vehicle.

According to the present teachings, the master cylinder comprises a fastening collar, which corresponds to an adapter region of the pedal carrier. Accordingly, the fastening collar is designed to engage at least in some region or regions with at least one latching means arranged on the adapter region in the state in which it is connected to the pedal carrier.

The resulting advantages have already been explained in detail above in connection with the clutch pedal system, and therefore attention is drawn at this point to the previous statements. Both the advantageous developments of the master cylinder which have been explained above in conjunction with the clutch pedal system and those which remain to be explained below apply to the possible configurations of the master cylinder which will now be described and, conversely, also to the clutch pedal system which has been explained above.

The master cylinder comprises a dust boot. The dust boot is provided to protect the moving parts of the master cylinder from the penetration of any foreign bodies and/or fluids. Primarily, this is a matter of protection of one or more sealing means arranged on or in the master cylinder. Thus, the master cylinder normally has a cylinder body with a piston rod supported therein in a linearly displaceable manner, which is sealed with respect to the cylinder body in an entry region of the cylinder body by means of an appropriate sealing means. Accordingly, the entry region is preferably to be protected by being coverable by the dust boot.

The master cylinder also has a detection means, which can be arranged, for example, in or on the master cylinder. The detection means is designed, for example, to detect a current position of the pivotable clutch pedal. Thus, the detection means can be used for an "automatic start-stop system," in which the internal combustion engine is automatically switched off when stopping at traffic lights, for example. One criterion for switching off and then restarting the internal combustion engine is the position of the clutch pedal. Accordingly, the depression of the clutch while the internal combustion engine is switched off is evaluated as an imminent drive away phase and the internal combustion engine is restarted.

Of course, the detection means can also detect further information as regards the position of the clutch pedal. For this purpose, the detection means can be designed, for example, as a linear sensor or as a simple switch.

Figure 1:
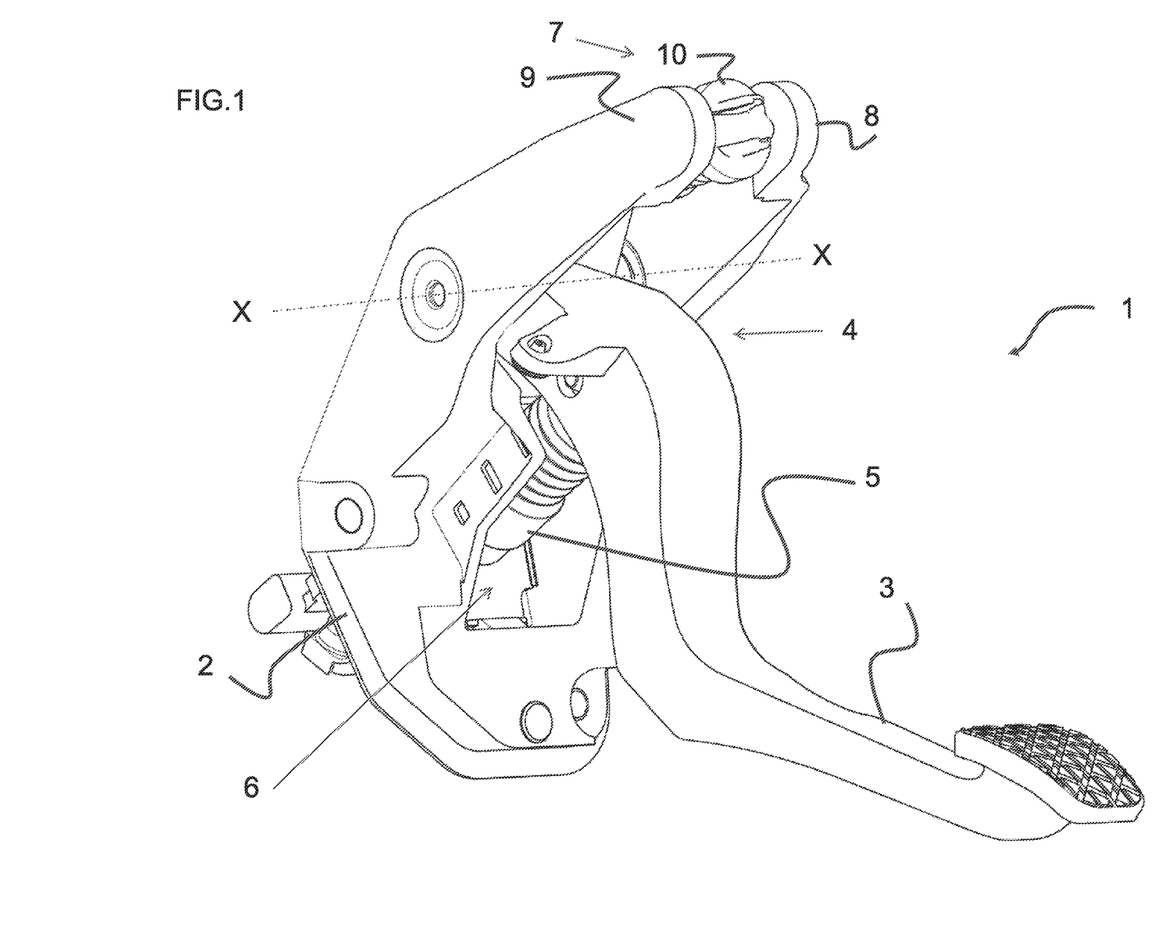
FIG. 1 is a perspective front view of a clutch pedal system in accordance with the present teachings.

Turning now to the drawings, a clutch pedal system 1 can be seen in FIG. 1. This serves for arrangement within a vehicle (not shown); more precisely in the foot well thereof (not shown).

The clutch pedal system 1 comprises a pedal carrier 2, on which a clutch pedal 3 is mounted. The clutch pedal 3 can be pivoted about a pivoting axis x, which for this purpose extends at the end through the clutch pedal 3 and a bearing region 4 of the pedal carrier 2. The clutch pedal system 1 under consideration is used for hydraulic actuation of a clutch (not shown) of the kind typically used to separate an engine from a stepped transmission in order to shift the transmission in the state decoupled in this way.

The clutch pedal system 1 also comprises a master cylinder 5, which is arranged within the pedal carrier 2. For this purpose, the pedal carrier 2 has an adapter region 6, by means of which the master cylinder 5 is connected to the pedal carrier 2. On the one hand, the master cylinder 5 is coupled in a manner not visible in detail to the clutch pedal 3, while, on the other hand, it is supported on the pedal carrier 2, in particular on the adapter region 6 thereof.

With reference to the illustration in FIG. 1, the pedal carrier 2 has a clevis bearing 7 above its bearing region 4 for the clutch pedal 3. The clevis bearing 7 comprises two mutually spaced legs 8, 9, between which an overcenter spring 10 is arranged so as to be pivotable. The overcenter spring 10 is accordingly arranged between the pedal carrier 2 and the clutch pedal 3. The force required to hold down the clutch pedal 3 is reduced by the overcenter spring 10 via a connection (not shown) between the clutch pedal 3 and the overcenter spring 10.

Figure 2:
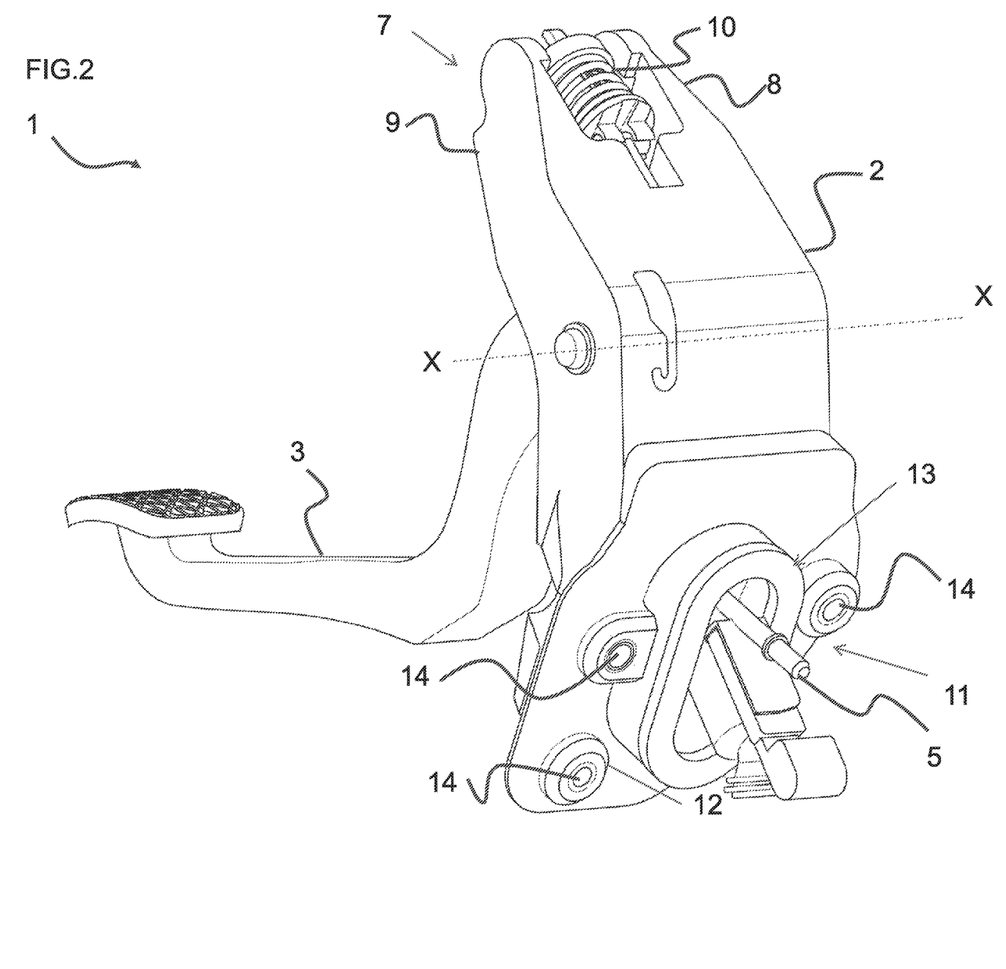
FIG. 2 is in a perspective rear view of the clutch pedal system of FIG. 1.

FIG. 2 shows a perspective rear view of the clutch pedal system 1 of FIG. 1. In this view, it can be seen that the pedal carrier 2 has a through opening 11 situated within its adapter region 6, through which the master cylinder 5 is at least partially arranged. Around the through opening 11, the pedal carrier 2 furthermore has a fastening region 12. The fastening region 12 is designed to enable the clutch pedal system 1 to be arranged in the foot well of the vehicle (not shown). For this purpose, the fastening region 12 also comprises a frame 13, which extends around the through opening 11 and which is designed to support the clutch pedal system 1 around an aperture (not shown here) in the foot well of the vehicle (not shown).

In order to connect the clutch pedal system 1 to the vehicle (not shown) by means of its pedal carrier 2, the fastening region 12 of the system has a number of fastening holes 14, the number of which are illustrated in FIG. 2 is three. However, as will be understood by those of ordinary skill in the art, the number of fastening holes 14 may vary dependent on the desired design. The fastening holes 14 are provided to enable fastening means (not shown), e.g. screws, which can be arranged through the fastening holes, to be accommodated. Ultimately, these fastening means serve to fix the clutch pedal system 1 in the envisaged installed position thereof.

Figure 3:
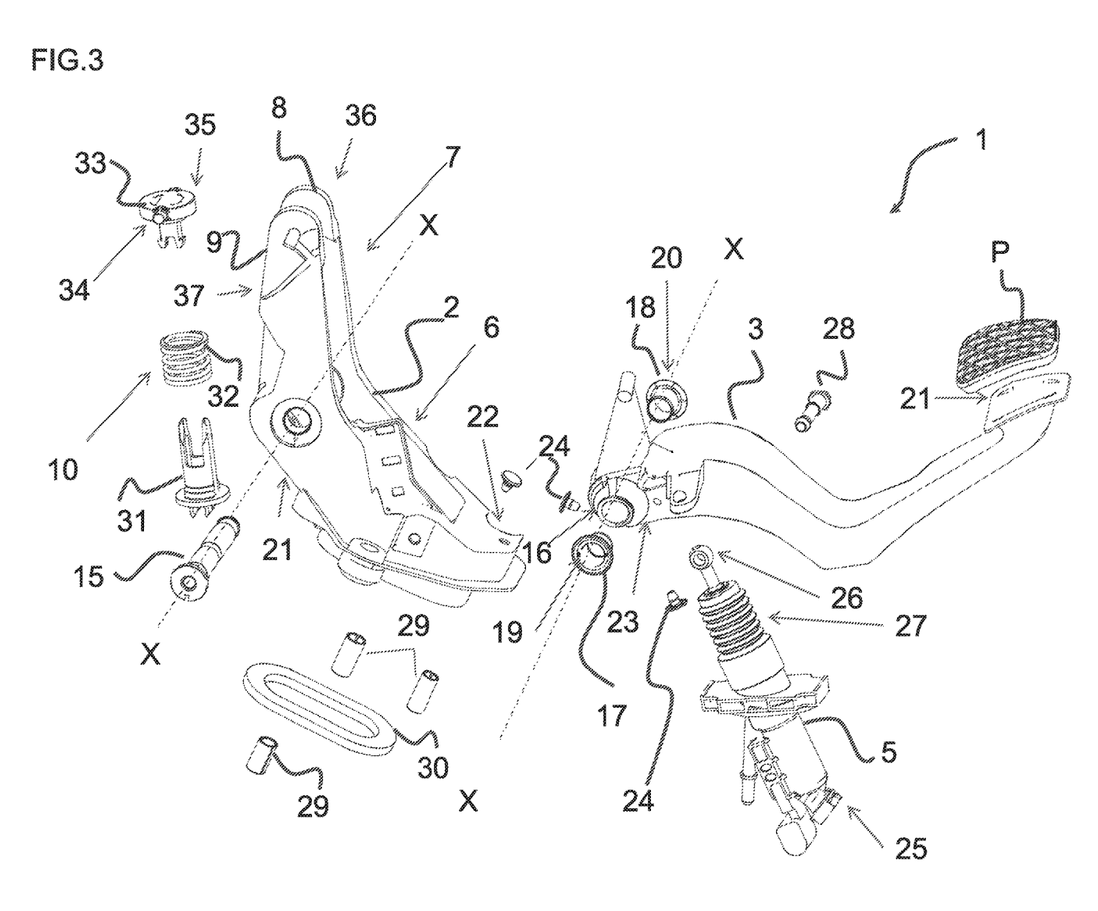
FIG. 3 is an exploded view of the individual components of the clutch pedal system of FIGS. 1 and 2.

FIG. 3 is an exploded view of the individual components of the clutch pedal system 1 of FIGS. 1 and 2. As can be seen, in terms of construction, the pivoting axis x of the clutch pedal 3 is formed by a bearing pin 15. The clutch pedal 3, for its part, has a bearing opening 16 arranged at the end, into which cylindrical bearing bushes 17, 18 arranged on both sides are introduced. To control the end position of the bearing bushes 17, 18 and to space apart the clutch pedal 3 installed in the pedal carrier 2, the bearing bushes 17, 18 each have a collar 19, 20 at one end. In combination with bearing openings 21, likewise arranged in the pedal carrier 2, the bearing pin 15 can thus be introduced through the openings and through the bearing opening 16 in the clutch pedal 3 while simultaneously incorporating the bearing bushes 17, 18.

A tread surface T, which serves for the arrangement of a pedal rubber P, is formed at an opposite end of the clutch pedal 3 from the bearing opening 16. Increased friction and hence the capacity for controlled operation of the clutch pedal 3 by the person operating the vehicle is thereby achieved.

In the present case, a first exemplary embodiment of an end stop 22 can be seen on the pedal carrier 2 for the clutch pedal 3. This is designed to limit in an appropriate manner the maximum possible pivoting range when depressing the clutch pedal 3. Here, the end stop 22 is in the form of a level surface, which corresponds in the assembled state of the clutch pedal system 1 to a cantilever arm 23 arranged on the clutch pedal 3. To soften the landing of the cantilever arm 23 on the end stop 22 of the pedal carrier 2, flexible damping elements 24 are furthermore provided, these being arranged on the cantilever arm 23.

The master cylinder 5 comprises a cylinder body 25 and a piston rod 26, which is mounted so that it can be displaced in a linear manner within the cylinder body 25. At the same time, the piston rod 26 is very largely covered by a dust boot 27, which is connected to the cylinder body 25. To connect the free end of the piston rod 26 to the clutch pedal 3, another bearing pin 28 is provided. During assembly, the pin is arranged through openings (not specifically visible here) within the clutch pedal 3 and the free end of the piston rod 26.

In order to reinforce the fastening holes 14 in the pedal carrier 2, the holes being visible in FIG. 2, bushings 29, an appropriate number of which can be seen, are provided and are arranged for this purpose in the fastening holes 14. Also visible is a sealing means 30, which, in the illustrated exemplary embodiment, has an extended "O" or elliptical shape. The sealing means 30 is a pre-shaped flat gasket, which is provided for incorporation between the pedal carrier 2 and the foot well of the vehicle (not shown). For this purpose, the sealing means 30 has a contour matched to the shape of the frame 13 (see FIG. 2), allowing the pedal carrier 2 to be sealed off by means of its frame 13 against a bulkhead and/or a dashboard carrier of the vehicle (not shown) while incorporating the sealing means 30.

The overcenter spring 10, which is shown, may comprise three parts; more specifically, a supporting body 31, a helical spring 32, which can be arranged around the supporting body 31, and a bearing body 33, which is connected at the end to the supporting body 31. In the assembled state of the overcenter spring 10, the helical spring 32 is thus incorporated between the supporting body 31 and the bearing body 33. To enable the overcenter spring 10 to be mounted pivotably between the legs 8, 9 of the clevis bearing 7, the bearing body 33 has two pivots 34, 35, which engage in openings 36, 37 formed in the legs 8, 9 of the clevis bearing 7 in the assembled state of the overcenter spring 10.

Figure 4:
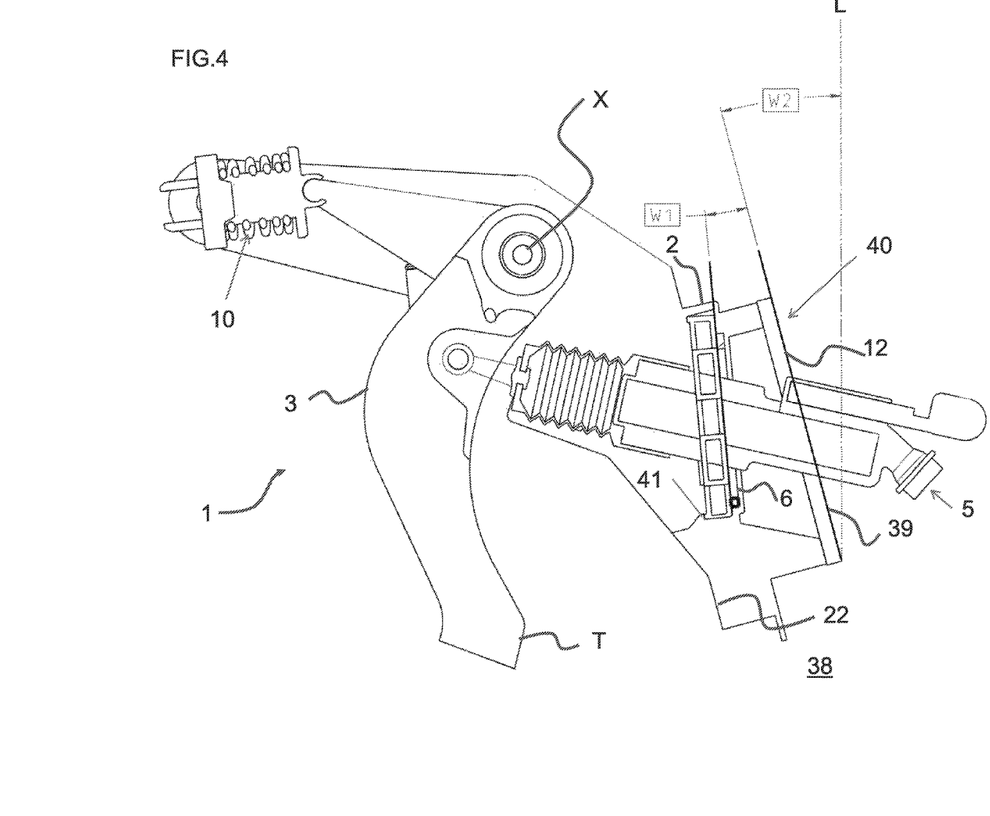
FIG. 4 is an at least partially sectioned side view of the clutch pedal system of FIGS. 1 and 2 in its installed position in the foot well within a vehicle.

In FIG. 4, an exemplary embodiment of the fully assembled clutch pedal system 1 in its envisaged arrangement in the foot well 38 of a vehicle is illustrated. The clutch pedal 3, which, as is apparent, is shown twice, is intended to illustrate the pivoting range thereof during its actuation. The foot well 38 is delimited with respect to a vehicle engine compartment (not shown) by a bulkhead 39 and/or by a dashboard carrier 39. The bulkhead 39 and/or the dashboard carrier 39 have an aperture 40, through which at least a section of the master cylinder 5 is arranged. In this case, the pedal carrier 2 is arranged around the aperture 40, on the bulkhead 39 and/or the dashboard carrier 39, by means of its fastening region 12.

As shown, the master cylinder 5 has a fastening collar 41, which is firmly connected to the cylinder and corresponds to the adapter region 6. As a result, the master cylinder 5 is in contact, via its fastening collar 41, with the adapter region 6 of the pedal carrier 2. Here, the alignment of the master cylinder 5 is predetermined by the position of its fastening collar 41, which, in turn, depends on the alignment of the adapter region 6.

In accordance with the present teachings, the master cylinder 5 is a universal component, while the pedal carrier 2 is an individually adapted or adaptable adapter. Accordingly, the pedal carrier 2 is of replaceable configuration in order to compensate any differences in the inclination of the bulkhead 39 and/or of the dashboard carrier 39 through different configurations as regards the alignment of its adapter region 6 relative to its fastening region 12, while retaining the master cylinder 5. As can be seen, the respective planes of the adapter region 6 and of the fastening region 12 enclose an angle w1 between them. Another angle w2 of the bulkhead 39 and/or of the dashboard carrier 39 relative to a vertical L can range from 27.5° to 0°. In order then to compensate these different angles w2 of the bulkhead 39 and/or of the dashboard carrier 39 relative to the vertical L, the inclination of the fastening region 12 of the pedal carrier 2 is adapted accordingly, while the inclination of the adapter region 6 for the master cylinder 5 preferably remains the same. For this reason, the angle w1 between the adapter region 6 and the fastening region 12 is adapted in accordance with the changing angle w2 between the bulkhead 39 and/or the dashboard carrier 39 and the vertical L. Angles between the dash board and the clutch master cylinder can vary between 0° and 27.5°. The angle of the dash board is optimized due to required powertrain installation and hence it is vehicle specific. The adaptor angle will be tuned such that for any given dash board angle the clutch master cylinder is positioned in order to allow bleeding of the hydraulic clutch system. In this way, the alignment of the master cylinder 5 and/or of the pedal carrier 2 in the foot well 38 can be retained, even if the inclination of the bulkhead 39 and/or of the dashboard carrier 39 changes.

In the present case, another alternative exemplary embodiment for the end stop 22 is illustrated in FIG. 4. This is now placed well below the clutch pedal 3 on the pedal carrier 2. When the clutch pedal 3 is depressed, it consequently comes into contact with the end stop 22 in the region of its tread surface T.

Thus, the end stop 22 is arranged in a region of the pedal carrier 2 which is situated at a long distance radially from the pivoting axis x of the clutch pedal 3, with the result that the lever arm of the clutch pedal 3 acting on the end stop 22 is very largely reduced. In this way, the forces which have to be accepted by the end stop 22 are correspondingly lower than in the first exemplary embodiment illustrated in FIG. 3, simplifying the embodiment thereof and/or allowing it to be produced more economically overall.

Figure 5:
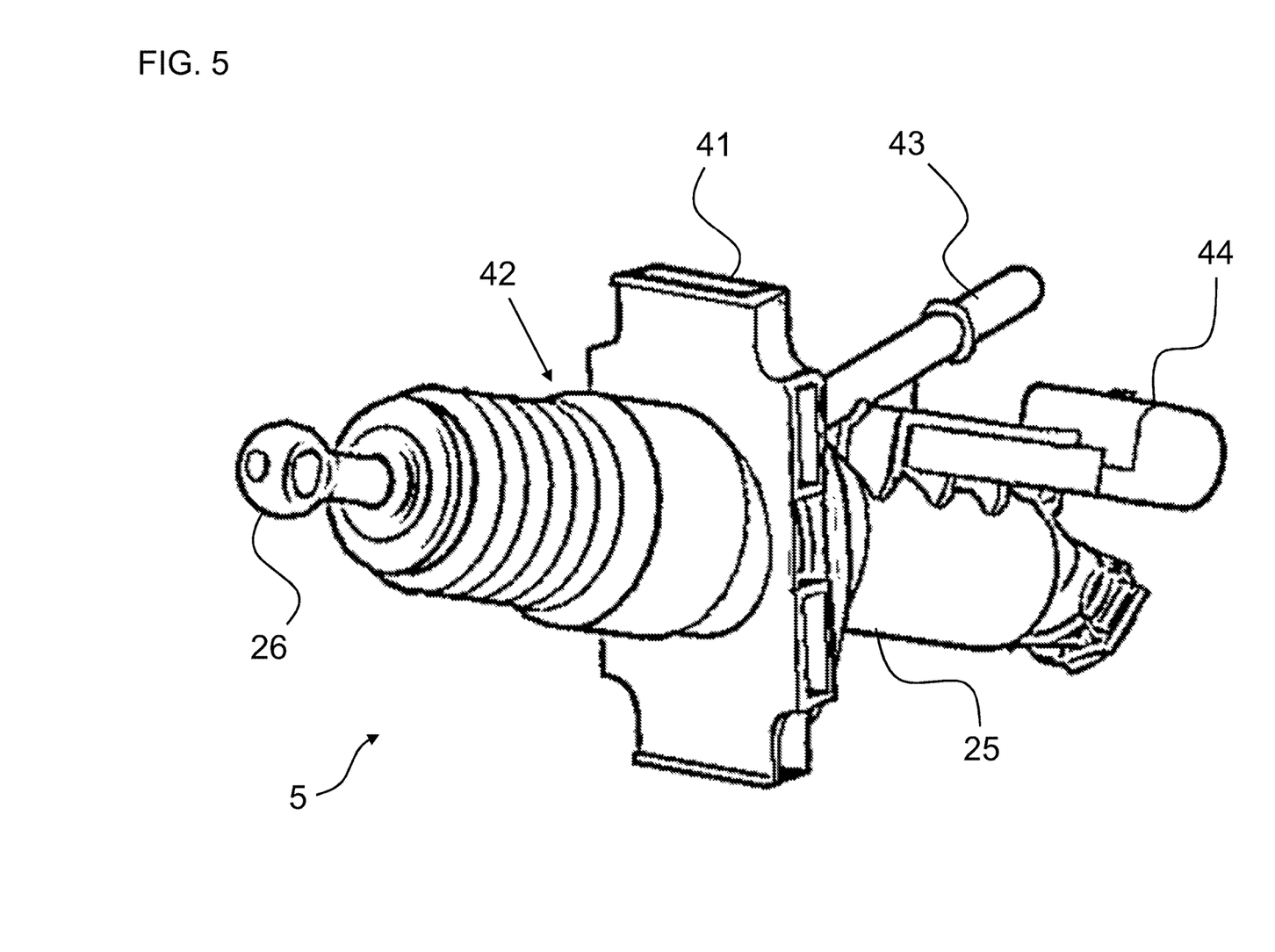
FIG. 5 is a perspective view of the master cylinder component of the clutch pedal system of FIGS. 1-4.

FIG. 5 shows the master cylinder 5 in detail. Here, the configuration of the fastening collar 41, which extends around the cylinder body 25 of the master cylinder 5, is visible. The dust boot 27 is arranged in such a way that it covers an entry region 42 of the piston rod 26 into the cylinder body 25, protecting it from the ingress of foreign bodies and/or fluids.

The cylinder body 25 furthermore has a connection piece 43, which is provided so as to be coupled for fluid transmission to a pressure line (not shown) of a hydraulic system. In this way, the actuation of the clutch pedal 3 can be transmitted to the clutch (not shown). Here, an appropriate transmission ratio can be established by means of different piston diameters, if required.

Also visible is a detection means 44, which is arranged, for example, on the cylinder body 25 of the master cylinder 5. The detection means 44 is designed to detect the current position of the pivotable clutch pedal 3 and to transmit it to a suitable point, e.g., via an electric lead (not shown).

Figure 6:
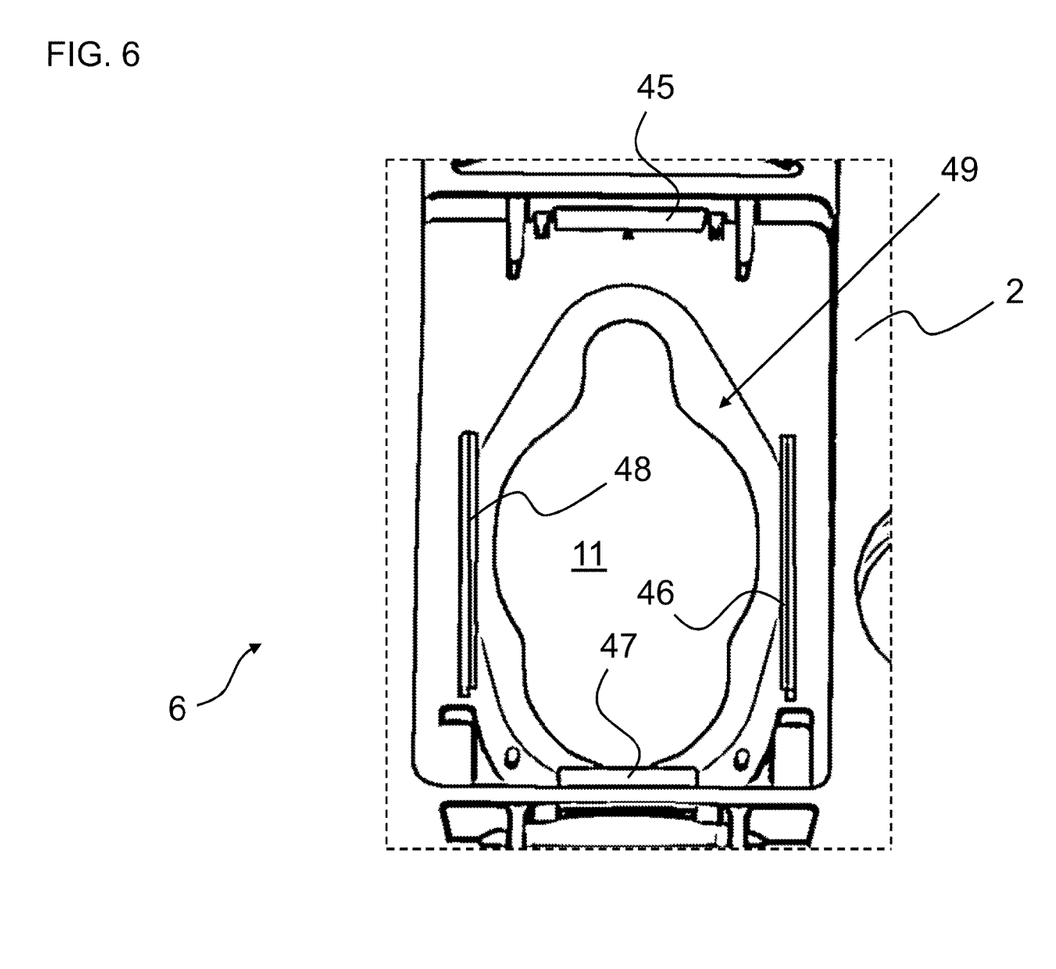
FIG. 6 is a front view of a receiving region of the clutch pedal system of FIGS. 1 to 4 configured to receive the master cylinder of FIG. 5.

FIG. 6 shows a detail of the pedal carrier 2, with a view of the adapter region 6 thereof. The adapter region 6 comprises the through opening 11, which was already visible in FIG. 2, through which the master cylinder 5 (not shown here) can be at least partially arranged. The through opening 11 has a convex contour, which is matched to the mounting direction of the master cylinder 5 and to the outside dimensions thereof. The upper cut out, in particular, is used here to pass through the connection piece 43 of the master cylinder 5.

Figure 7:
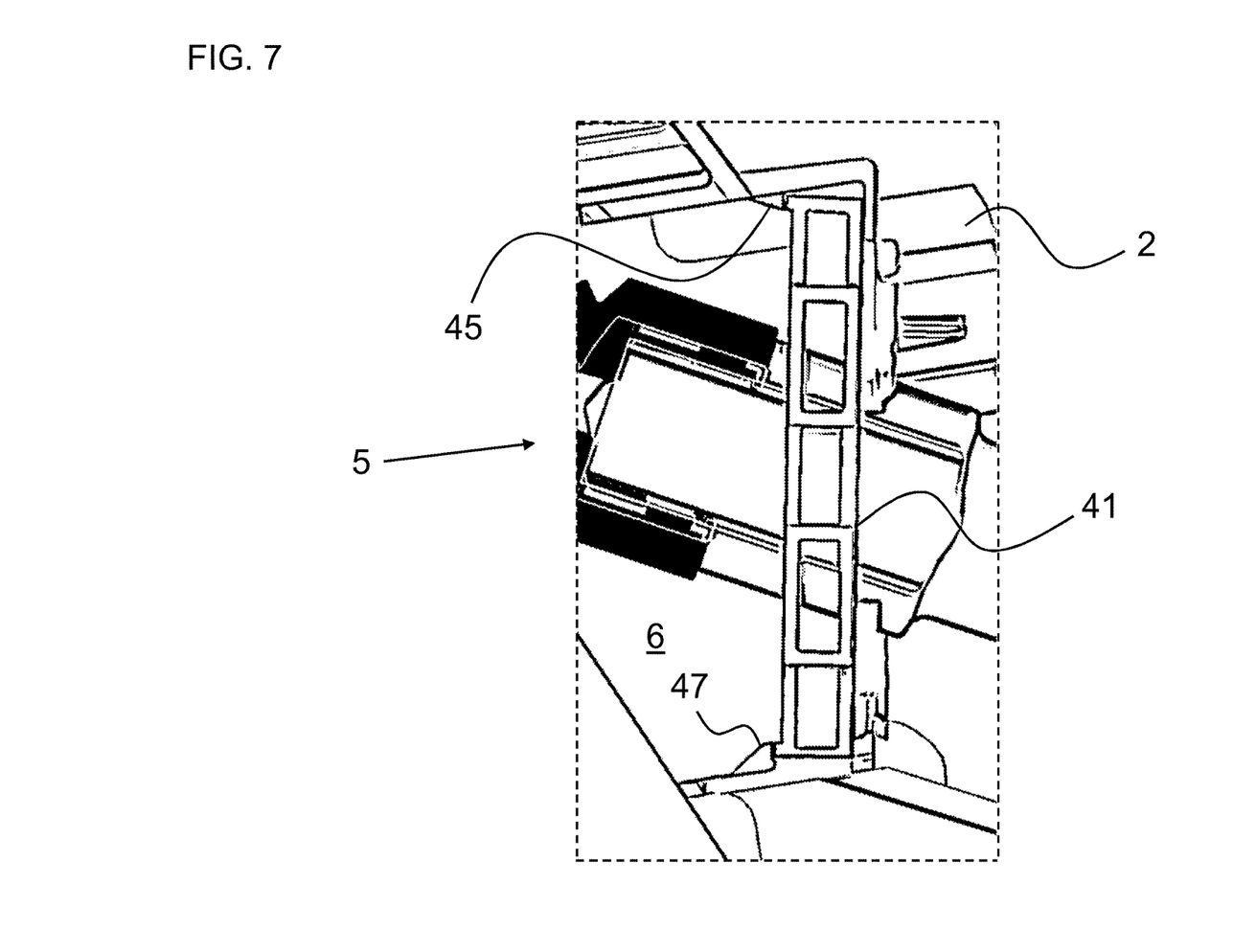
FIG. 7 is a partially sectioned side view of the master cylinder of FIG. 5, the cylinder being coupled to the receiving region of the clutch pedal system in accordance with the present teachings.

As shown, the adapter region 6 of the pedal carrier 2 comprises individual latching means 45, 46, 47, 48, by means of which the master cylinder 5 (not shown here) can be connected to the pedal carrier 2. A stepped peripheral region 49, which can serve to accommodate a sealing means 30 (not shown specifically here), can be seen around the through opening 11. The latching means 45-48 may comprise, for example, a bayonet, a cam lock, a compression latch, a draw latch, a rotary latch, and a push-and-click. FIG. 7 shows a detail of the inserted state of the master cylinder 5 in the pedal carrier 2. In the side view illustrated, the cylinder 5 is evidently held in its position within the adapter region 6 solely by the latching means 45-48, without further connection means. For this purpose, the latching means 45-48 are in engagement with the fastening collar 41 of the master cylinder 5. More specifically, the latching means 45-48 of the adapter region fit around the fastening collar 41, at least in some region or regions. Thus, the master cylinder 5 may also be removable, if appropriate, by canceling the latching connection through a deliberate intervention. Nevertheless, the latching connection is embodied in such a way that it does not come loose accidentally, thus ensuring operational reliability.

Figure 8:
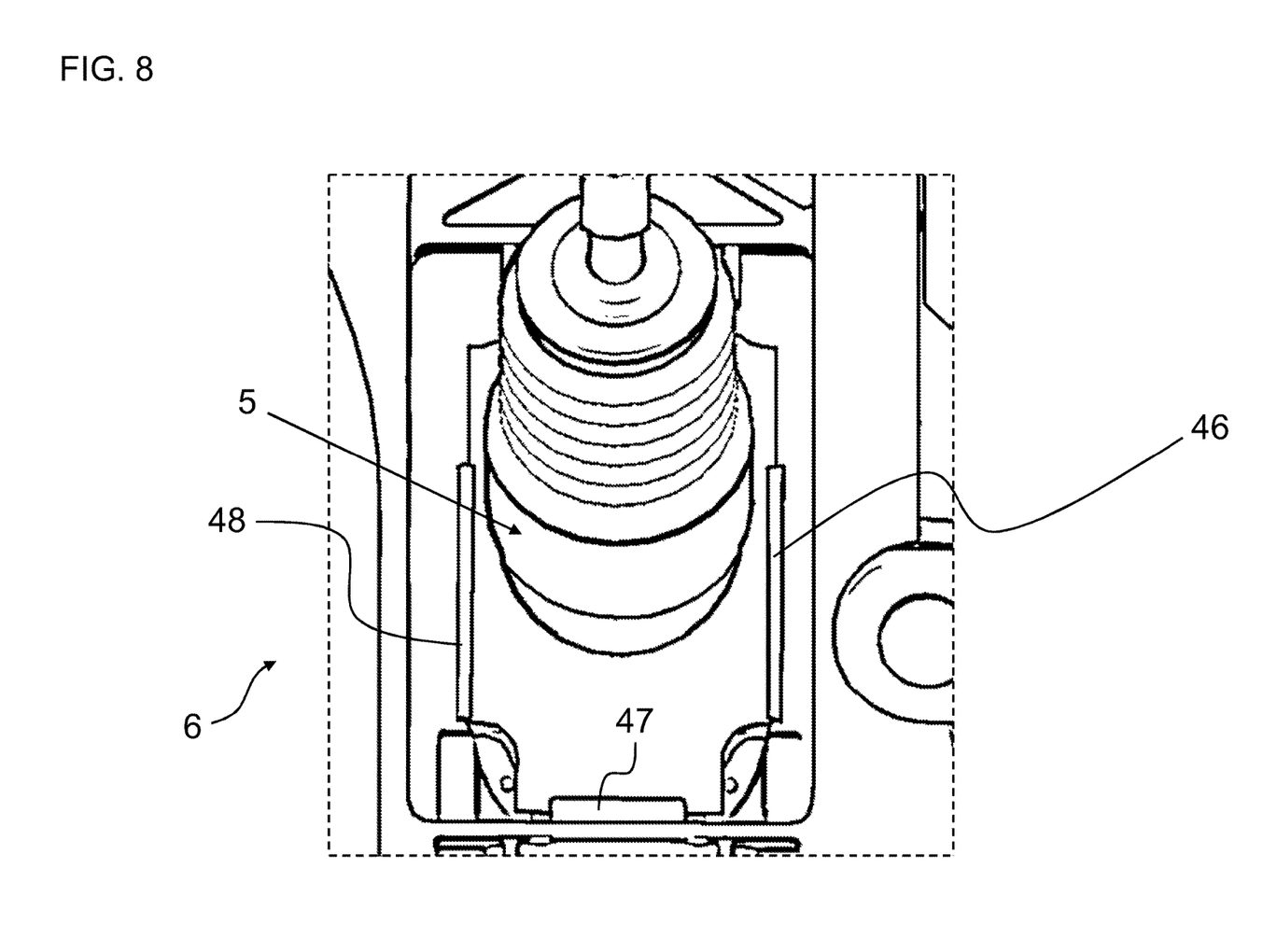
FIG. 8 is a front view of the master cylinder of FIG. 5, the cylinder having been inserted into the receiving region of the clutch pedal system (shown in FIG. 6) in accordance with the present teachings.

FIG. 8 once again shows the adapter region 6 of the pedal carrier 2 as in FIG. 6, and, in the present case, the master cylinder 5 is integrated in the manner described previously. In this illustration, it is once again clear how the individual latching means 45-48 fit around the fastening collar 41 of the master cylinder 5.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more FIGS. represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A clutch pedal system for a vehicle, comprising:
   a pedal carrier having a fastening region configured to be aligned with an aperture in a bulkhead of the vehicle;
   a clutch pedal pivotably mounted on the pedal carrier; and
   a master cylinder comprising a fastening collar;
   wherein the master cylinder is supported on the pedal carrier and connected to the clutch pedal, wherein the pedal carrier is configured to position the master cylinder at a predetermined angle relative to the bulkhead.

2. The clutch pedal system as claimed in claim 1, wherein the pedal carrier includes at least one securing element, and the fastening collar is configured to be engaged by the at least one securing element to secure the master cylinder to the pedal carrier and position the master cylinder relative to the bulkhead.

3. The clutch pedal system as claimed in claim 1, wherein the pedal carrier has an end stop configured to limit a maximum pivoting range for depression of the clutch pedal.

4. The clutch pedal system as claimed in claim 2, wherein the at least one securing element is a latch.

5. The clutch pedal system as claimed in claim 2, wherein the pedal carrier has a through opening, wherein the master cylinder extends at least partially through the through opening.

6. The clutch pedal system as claimed in claim 1, wherein the pedal carrier comprises a frame, at least a portion of which is positionable around the aperture in the bulkhead of the vehicle.

7. The clutch pedal system as claimed in claim 6, wherein the frame is configured to seal off the aperture in the bulkhead via a seal.

8. The clutch pedal system as claimed in claim 1, further comprising an overcenter spring arranged between the pedal carrier and the clutch pedal.

9. The clutch pedal system as claimed in claim 1, wherein the master cylinder further comprises a dust boot, and a sensor, and the fastening collar is configured to engage with at least one securing element arranged on the pedal carrier.

10. The clutch pedal system as claimed in claim 9, wherein the dust boot is configured to cover an entry region of a piston rod into a cylinder body of the master cylinder.

11. The clutch pedal system as claimed in claim 10, wherein the sensor is configured to detect a current position of the pivotable clutch pedal.

12. The clutch pedal system as claimed in claim 1, wherein the predetermined angle is an angle in which the master cylinder is oriented to allow bleeding of a clutch system.

13. A method of installing in a vehicle a universal master cylinder at a predetermined angle, comprising:
    determining an angle of a bulkhead of the vehicle,
    selecting a pedal carrier based on the angle;
    positioning the universal master cylinder on the selected pedal carrier; and
    connecting the selected pedal carrier to the bulkhead to position the universal master cylinder at the predetermined angle within an aperture of the bulkhead to seal the aperture.

14. The method of claim 13, further comprising connecting the universal master cylinder to a clutch pedal mounted on the pedal carrier.

15. The method of claim 13, wherein positioning the universal master cylinder on the selected pedal carrier includes positioning a portion of the universal master cylinder through an opening in the pedal carrier.

16. The method of claim 15, further comprising fastening a collar of the universal master cylinder to a region of the pedal carrier.

17. The method of claim 16, wherein fastening the collar includes engaging the collar with latches of the pedal carrier.

18. The method of claim 13, wherein connecting the selected pedal carrier to the bulkhead to position the universal master cylinder at the predetermined angle within the aperture of the bulkhead includes positioning the universal master cylinder to allow bleeding of a clutch system.

* * * * *